(12) United States Patent
Lee et al.

(10) Patent No.: US 7,453,054 B2
(45) Date of Patent: Nov. 18, 2008

(54) METHOD AND APPARATUS FOR CALIBRATING PARALLEL READOUT PATHS IN IMAGERS

(75) Inventors: Chiajen M. Lee, Irvine, CA (US); Kwang-Bo Cho, Valencia, CA (US)

(73) Assignee: Aptina Imaging Corporation, Grand Cayman (KY)

( * ) Notice: Subject to any disclaimer, the term of this patent is extended or adjusted under 35 U.S.C. 154(b) by 108 days.

(21) Appl. No.: 11/208,782

(22) Filed: Aug. 23, 2005

(65) Prior Publication Data

US 2007/0045677 A1  Mar. 1, 2007

(51) Int. Cl.
 *H01L 27/00* (2006.01)
 *H03F 3/08* (2006.01)
 *H04N 3/14* (2006.01)

(52) U.S. Cl. .............................. 250/208.1; 250/214 A; 348/300

(58) Field of Classification Search .............. 250/208.1, 250/214 AG, 214 R, 214 A, 200, 214.1, 214 LA; 348/300, 301, 302, 229.1, 230.1, 269, 281, 348/320, 322, 307, 308, 309, 310; 257/291
See application file for complete search history.

(56) References Cited

U.S. PATENT DOCUMENTS

| | | | |
|---|---|---|---|
| 6,140,630 A | 10/2000 | Rhodes | |
| 6,204,524 B1 | 3/2001 | Rhodes | |
| 6,310,366 B1 | 10/2001 | Rhodes et al. | |
| 6,320,186 B1* | 11/2001 | Young et al. | 250/252.1 |
| 6,326,652 B1 | 12/2001 | Rhodes | |
| 6,333,205 B1 | 12/2001 | Rhodes | |
| 6,903,670 B1* | 6/2005 | Lee et al. | 341/118 |
| 2002/0051067 A1* | 5/2002 | Henderson et al. | 348/241 |
| 2006/0044413 A1* | 3/2006 | Krymski | 348/230.1 |

* cited by examiner

*Primary Examiner*—Georgia Y. Epps
*Assistant Examiner*—Don Williams
(74) *Attorney, Agent, or Firm*—Dickstein Shapiro LLP

(57) ABSTRACT

An imaging device with readout chain circuitry that uses multiple analog-to-digital converters and amplifiers, which are similarly calibrated using a stitching technique, to readout each color of a column and mitigate the possibility of a boundary effect.

32 Claims, 7 Drawing Sheets

METHOD AND APPARATUS FOR CALIBRATING PARALLEL READOUT PATHS IN IMAGERS

FIELD OF THE INVENTION

The invention relates to an image sensor and more particularly to a readout technique and circuit for parallel readout of signals from a pixel array.

BACKGROUND OF THE INVENTION

Imaging devices, including charge coupled devices (CCD) and complementary metal oxide semiconductor (CMOS) imagers, are commonly used in photo-imaging applications.

A CMOS imager circuit includes a focal plane array of pixels, each one of the cells including a photosensor, for example, a photogate, photoconductor or a photodiode overlying a substrate for accumulating photo-generated charge in the underlying portion of the substrate. Each pixel has a readout circuit that includes at least an output field effect transistor formed in the substrate and a charge storage region formed on the substrate connected to the gate of an output transistor. The charge storage region may be constructed as a floating diffusion region. Each pixel may include at least one electronic device such as a transistor for transferring charge from the photosensor to the storage region and one device, also typically a transistor, for resetting the storage region to a predetermined charge level prior to charge transference.

In a CMOS imager, the active elements of a pixel perform the necessary functions of: (1) photon to charge conversion; (2) accumulation of image charge; (3) resetting the storage region to a known state; (4) transfer of charge to the storage region accompanied by charge amplification; (5) selection of a pixel for readout; and (6) output and amplification of a signal representing pixel charge. Photo charge may be amplified when it moves from the initial charge accumulation region to the storage region. The charge at the storage region is typically converted to a pixel output voltage by a source follower output transistor.

CMOS imagers of the type discussed above are generally known as discussed, for example, in U.S. Pat. No. 6,140,630, U.S. Pat. No. 6,376,868, U.S. Pat. No. 6,310,366, U.S. Pat. No. 6,326,652, U.S. Pat. No. 6,204,524 and U.S. Pat. No. 6,333,205, assigned to Micron Technology, Inc., which are hereby incorporated by reference in their entirety.

A typical four transistor (4T) CMOS imager pixel 10 is shown in FIG. 1. The pixel 10 includes a photosensor 12 (e.g., photodiode, photogate, etc.), transfer transistor 14, floating diffusion region FD, reset transistor 16, source follower transistor 18 and row select transistor 20. The photosensor 12 is connected to the floating diffusion region FD by the transfer transistor 14 when the transfer transistor 14 is activated by a transfer gate control signal TX.

The reset transistor 16 is connected between the floating diffusion region FD and an array pixel supply voltage Vaa_pix. A reset control signal RST is used to activate the reset transistor 16, which resets the floating diffusion region FD to the array pixel supply voltage Vaa_pix level as is known in the art.

The source follower transistor 18 has its gate connected to the floating diffusion region FD and is connected between the array pixel supply voltage Vaa_pix and the row select transistor 20. The source follower transistor 18 converts the charge stored at the floating diffusion region FD into an electrical output voltage signal Vout. The row select transistor 20 is controllable by a row select signal SEL for selectively connecting the source follower transistor 18 and its output voltage signal Vout to a column line 22 of a pixel array.

A typical CMOS imager 50 is illustrated in FIG. 2. The imager 50 includes a pixel array 52 connected to column sample and hold (S/H) circuitry 54. The pixel array 52 comprises a plurality of pixels arranged in a predetermined number of rows and columns. In operation, the pixels of each row in the array 52 are all turned on at the same time by a row select line and the pixels of each column are selectively output on a column line. A plurality of row and column lines are provided for the entire array 52.

The row lines are selectively activated by row decoder and driver circuitry (not shown) in response to an applied row address. Column select lines are selectively activated by column decoder 56 and driver circuitry contained within the column sample and hold circuitry 54 in response to an applied column address such that the signal on the column lines are sequential sampled and readout. Thus, a row and column address is provided for each pixel. The CMOS imager 50 is operated by a control circuit (not shown), which controls the row and column circuitry for selecting the appropriate row and column lines for pixel readout.

The CMOS imager 50 illustrated in FIG. 2 uses a dual channel readout architecture. That is, the imager 50 includes a first path (designated as G1/G2) and a second path (designated as R/B) for pixel and reset signals readout from the column lines of the array 52. Each readout path G1/G2, R/B is respectfully used to readout half the pixels connected to the column S/H circuitry 54. The first path G1/G2 outputs analog reset and pixel signals associated with green pixels while the second path R/B outputs analog reset and pixel signals associated with red or blue pixels depending on the row which is read. The pixel array 52 uses the well known Bayer pattern in which alternating rows of pixels are either alternating green and red pixel or alternating green and blue pixels.

Once readout, the green analog reset and pixel signals pass through an amplifier (PGA) 58 and an analog-to-digital converter (ADC) 62 before being processed as digital signals by a digital block 66. Amplifier 58 and ADC 62 comprise a green port of the imager 50. Once readout, the blue or red analog reset and pixel signals (depending on the row being read) pass through an amplifier (PGA) 60 and an analog-to-digital converter (ADC) 64 before being processed as digital signals by the digital block 66. Amplifier 60 and ADC 64 comprise a red/blue port of the imager 50.

The operational speed of the above-described readout circuitry is limited by processing constraints particularly as the size of the array 52 increases. In addition, attempts to speed up the circuitry may introduce undesirable noise into the readout process. Parallel readout architecture has been suggested in which the columns of an array row are read by more than the two analog-to-digital converters 62, 64, however, employing additional analog-to-digital converters operating in parallel may create a boundary effect due to the mismatch of gain and offset between adjacent readout channels. If the gain or offset of two readout channels are different, under uniform light the signals of the two adjacent columns readout by parallel analog-to-digital converters may create what appears to be an amplitude shift. The shift in amplitude may cause a boundary effect (e.g., one side of the image to be brighter than the other). Accordingly, there is a need and desire to increase the operational speed of the readout path circuitry while mitigating the possibility of boundary effects.

BRIEF SUMMARY OF THE INVENTION

Various exemplary embodiments of the invention provide an imaging device with readout chain circuitry that uses multiple analog-to-digital converters and amplifiers, which are similarly calibrated using a stitching technique, to readout each color of a column and mitigate the possibility of a boundary effect.

BRIEF DESCRIPTION OF THE DRAWINGS

The foregoing and other aspects of the invention will be better understood from the following detailed description of the invention, which is provided in connection with the accompanying drawings, in which.

DETAILED DESCRIPTION OF THE INVENTION

Figure 1:
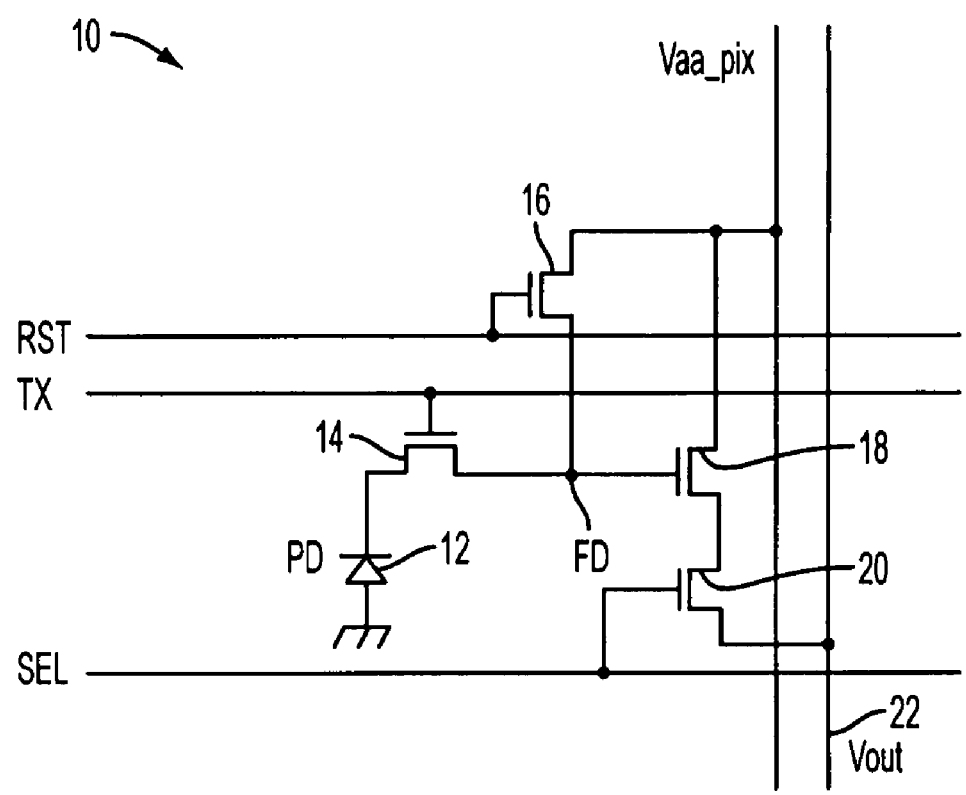
FIG. 1 illustrates a typical four transistor CMOS imager pixel.

In the following detailed description, reference is made to the accompanying drawings, which form a part hereof and illustrate specific embodiments in which the invention may be practiced. In the drawings, like reference numerals describe substantially similar components throughout the several views. These embodiments are described in sufficient detail to enable those skilled in the art to practice the invention, and it is to be understood that other embodiments may be utilized, and that structural, logical and electrical changes may be made without departing from the spirit and scope of the present invention.

The term "pixel" refers to a picture element unit cell containing a photo-conversion device and transistors for converting electromagnetic radiation to an electrical signal. It should be appreciated, however, that the invention is not limited to any particular pixel type or configuration.

The invention generally relates to parallel readout of columns in a pixel array. Initially, the analog-to-digital converters connected to the pixels predetermined to be readout in parallel are calibrated such that the same gain and offset are applied to the pixels readout through the parallel readout channels. The calibration of the readout channels is done by reading the same pixel information through the parallel channels and calibrating the channels according to the difference in the results. By reading the same pixel data through different readout channels it is possible to determine the differences in offset and gain between the channels. After at least the first two adjacent channels are calibrated, additional adjacent channels may also be calibrated.

Figure 2:
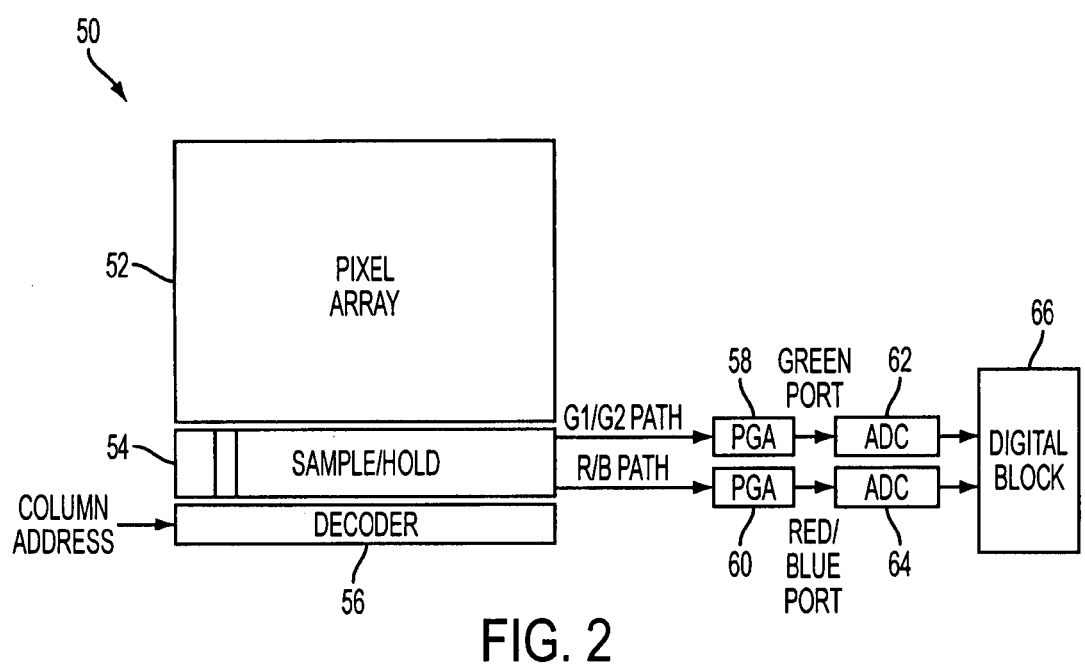
FIG. 2 is diagram of a portion of a typical CMOS imager.

As pixel arrays continue to increase in size and more columns are readout through each readout path, the parasitic elements (capacitances and/or resistances) on each readout path, in a typical CMOS imager readout scheme, illustrated in FIG. 2, increases linearly as the number of columns of the pixel array 52 increases, which in turn proportionally increases the speed requirements of the gain stages 58 and 60. The increased speed requirement is the key limiting factor in implementing readout circuits for large CMOS imagers. In contrast, in the exemplary embodiments, illustrated in FIGS. 3 and 5, increases the number of readout channels as the pixel array size increases. Accordingly, the parasitic elements on each readout channel are held constant. The readout circuit for larger CMOS imagers can be implemented by adding more "slices" of readout channels without increasing the speed requirements of each readout channel, and thus the need to increase the speed of the gain stages of a typical readout scheme is eliminated.

Figure 3:
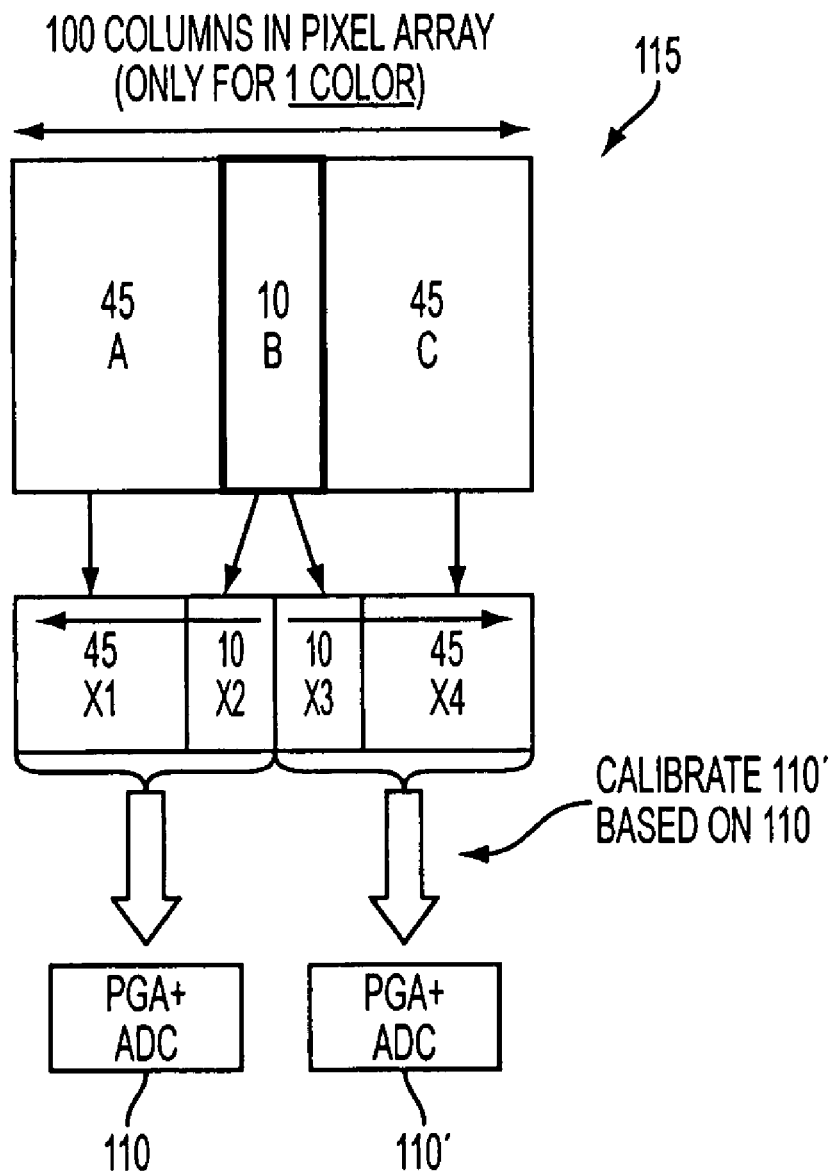
FIG. 3 is a block diagram illustrating a pixel readout architecture according to an exemplary embodiment of the invention.
Figure 4:
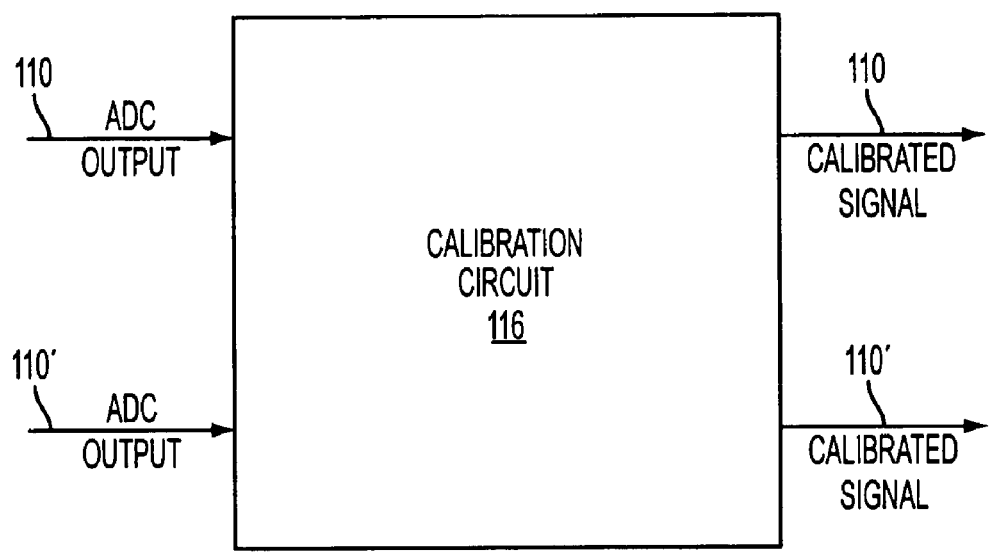
FIG. 4 illustrates a calibration circuit according to exemplary embodiments of the invention.

Calibration occurs before the pixel array 52 is readout and digitally processed. During the calibrating phase, the pixel columns, of a single color, are readout in parallel through two different analog-to-digital converter signal channels 110, 110' as illustrated in FIG. 3. A calibration circuit 116, illustrated in FIG. 4, determines the necessary calibration and calibrates the readout channels.

The invention described herein may be applied to both differential (e.g., Vrst–Vsig) and single ended signals (e.g., Vrst, Vsig) from pixels of an imager array. Although the figures may indicate that the signal into the analog-to-digital converters is single ended, the invention is not limited to single ended signals and can be applied to different analog-to-digital converters which directly receive Vrst and Vsig analog inputs and provide digital values representing the difference.

A predetermined number of columns are readout through each readout channel 110, 110' during calibration and the readout phases of operation. In an embodiment described herein, an exemplary pixel array 115 of 100 columns of one color of pixels is illustrated in FIG. 3. The array 115 illustrated in FIG. 3 only comprises the columns of the array 152 (illustrated in FIG. 6), having a particular color (e.g., red pixels). Typically, there are two colors of pixels in each column of pixel array 152, so only one half of the columns of the pixel array 152 are included in the exemplary pixel array 115. For example, in an pixel array 152 having a Bayer pattern, each column has two colors of pixels. Each individual column will have green pixels and either red or blue pixels. The green pixels that are in the columns with blue pixels are processed separately, as if they are a different color from the green pixels that are in the columns with red pixels. The red and blue pixels are also processed separately.

The pixel array 115 is organized into subgroups. The groups are used to distinguish which columns are processed by each readout channel during calibration by the calibration circuit 116. For example, as illustrated in FIG. 3, the pixel array is divided into three groups: group A having 45 columns, group B, a boundary group, having 10 columns and group C having 45 columns. In this exemplary embodiment, the pixels of group A and the pixels of group B will be sequentially readout through a first analog-to-digital converter readout channel 110. Group C will be sequentially readout through a second analog-to-digital readout channel 110' and in addition, group B will also be sequentially readout through the second analog-to-digital converter readout channel 110'. By reading out group B of pixels through both channels 110, 110', a calibration circuit 116, illustrated in FIG. 4, can determine the offset and gain differences between the two analog-to-digital converter channels 110, 110'.

In other words, the B column signals are readout from analog-to-digital converter channels 110 and 110' at the same time and the signal values for each B column signal in the respective analog-to-digital converter readout channels 110, 110' can be compared, by the calibration circuit 116, to determine the gains of the two analog-to-digital converter readout channels 110, 110' and to normalize the signals read through the two analog-to-digital converters readout channels 110, 110' and mitigate against any boundary effect. The output from the two analog-to-digital converter channels 110, 110' is processed by the calibration circuit 116 to determine the offset and gain differences.

The calibration circuit 116 adjusts the difference of the gain and offset of two adjacent readout channels such that an identical response may be obtained from either readout channel. This may be implemented by having the calibration circuit 116 adjust the gains of the two analog-to-digital readout channels 110, 110' so that the output signal from the channels 110, 110' have substantially the same value. The calibration circuit 116 may be a separate unit, which may be incorporated into the digital block 66, or the functions described herein may be accomplished by the software of an image processor.

Figure 5:
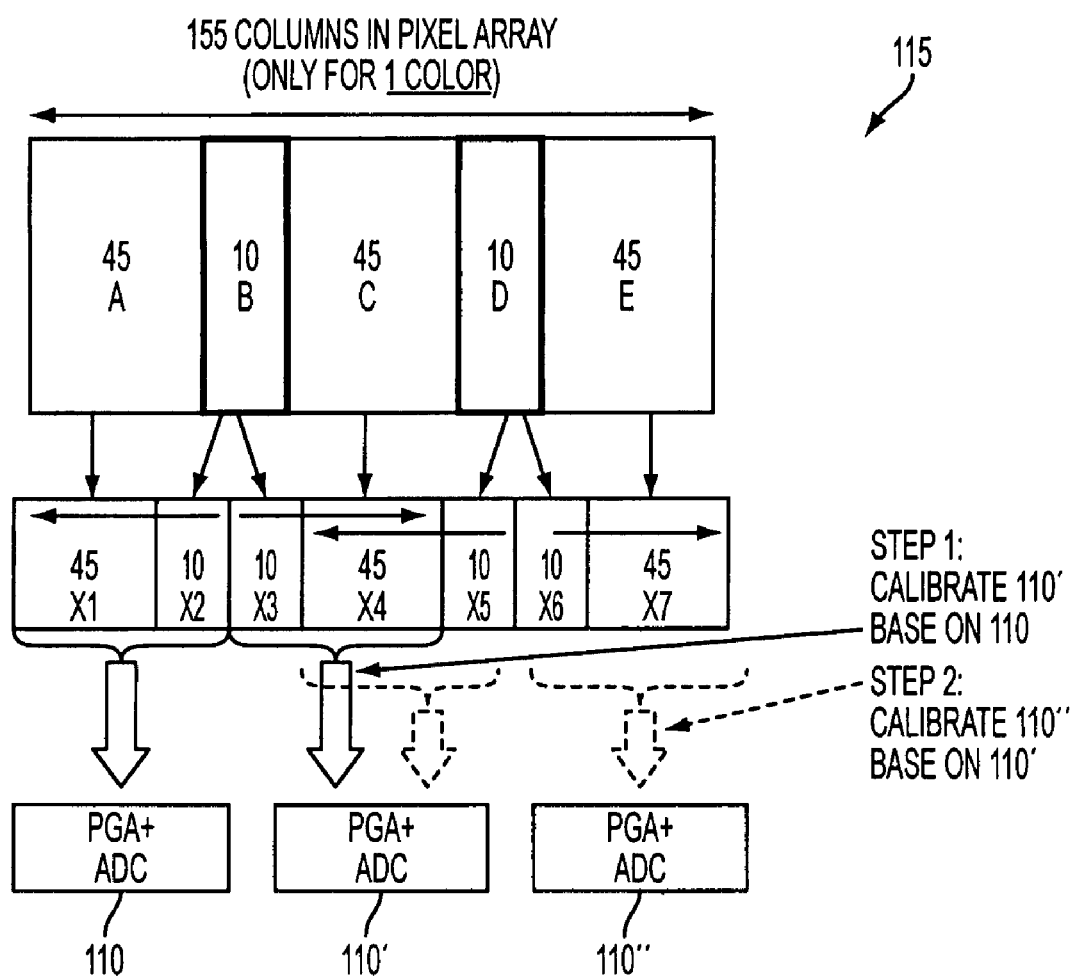
FIG. 5 is a block diagram illustrating a pixel readout architecture according to another exemplary embodiment of the invention.

Further, if the pixel array 115 has a larger number of columns, an additional readout channel 110" may be calibrated based on the previously calibrated readout channel 110', as illustrated in FIG. 5. As previously noted with regard to FIGS. 3-4, the pixels in group B, a boundary region, of the array 115 are readout through the first and second analog-to-digital converter readout channels 110, 110' and the offset and the gains of the analog-to-digital converter readout channels 110, 110' are calibrated by the calibration circuit 116 (FIG. 5). To calibrate an additional readout channel 110", a group of pixels in a second boundary region, group D, are readout through the second analog-to-digital converter readout channel 110', which has previously been calibrated based on the first readout channel 110, and the third analog-to-digital converter readout channel 110". The output of the analog-to-digital converter readout channels 110', 110" are input into the calibration circuit 116 where the offset and the gains for the channel 110' are determined and calibrated against the output of channel 110'. Additional readout channels may continue to be added and calibrated as necessary according to the processes described herein.

The invention is not limited to the embodiments described with reference to FIGS. 3 and 5. In order to calibrate at least two readout channels the same pixels are read through the readout channels, however, the invention can also be accomplished by reading the same plurality of pixels through more than two readout channels concurrently. After the pixels are read through the readout channels, a calibration circuit calculates the offsets and gain of differences of the channels and calibrates the readout channels such that the offsets approach zero and the gains are substantially the same. The invention is not limited to reading out boundary pixels and any pixel data may be read through parallel channels. One advantage of adding additional readout channels (e.g., 110, 110', etc.) is to maintain the parasitic capacitance of the readout channels at constant low levels, thereby a larger pixel array can be readout out in parallel without the need to increase the processing speed of the readout channels.

During image readout, after calibration has been completed, the columns of the pixel array 115 are readout in parallel through each of the readout channels. Each pixel column, at this stage, will only be readout once. The columns, which during calibration were readout through the two readout channels (e.g., group B, group D), for example, may all be readout through the first or second channels 110, 110' for group B, or third channel 110" for group D or any combination of the channels, however, each pixel is only readout once.

Figure 6:
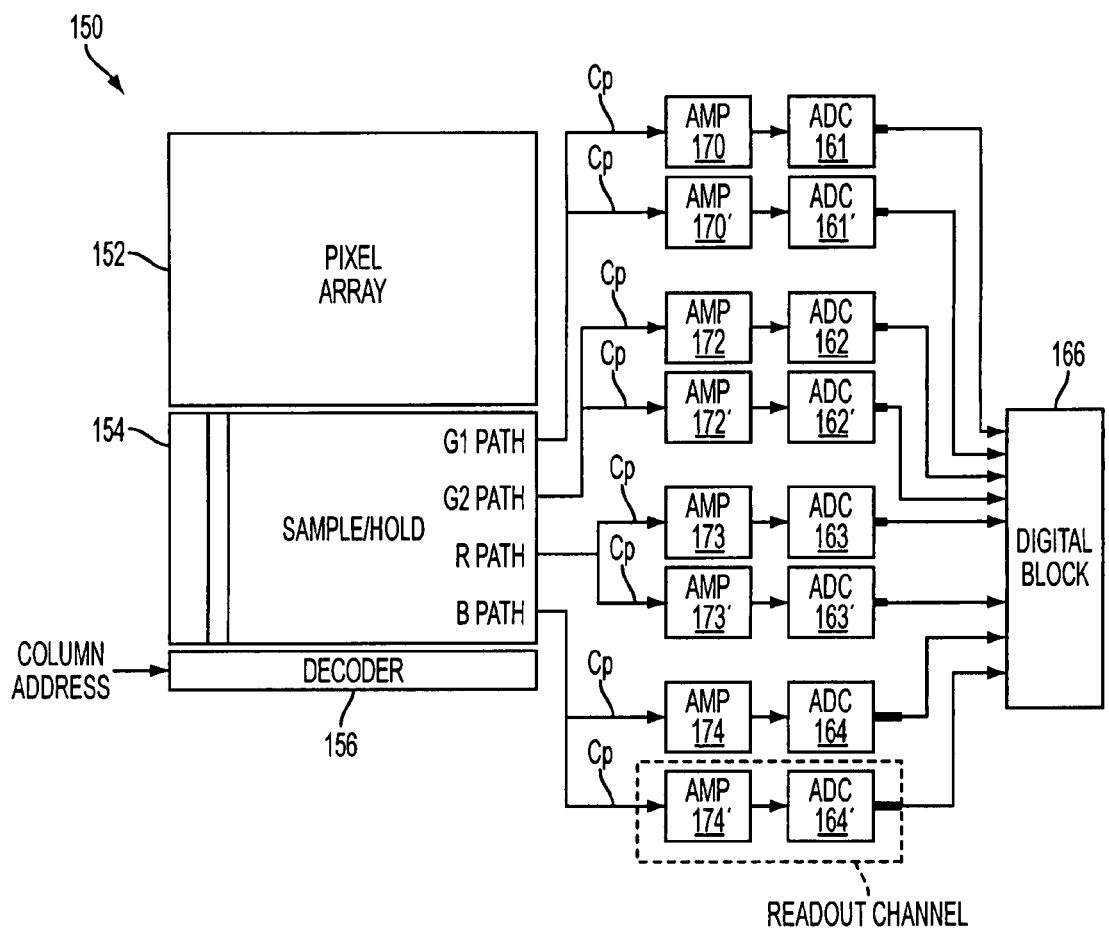
FIG. 6 is diagram of a portion of a CMOS imager according to the exemplary embodiment illustrated in FIG. 3.

FIG. 6 illustrates an exemplary imager 150 which includes a pixel array 152, comprised of a plurality of color arrays 115 (FIGS. 3, 5), connected to column sample and hold (S/H) circuitry 154. The pixel array 152 comprises a plurality of pixels arranged in a predetermined number of rows and columns. In operation, the pixels of each row in the array 152 are all turned on at the same time by a row select line and the pixels of each column are selectively output on a column line. A plurality of row and column lines are provided for the entire array 152.

The row lines are selectively activated by row decoder and driver circuitry (not shown) in response to an applied row address. Column select lines are selectively activated by column decoder 156 and driver circuitry contained within the column sample and hold circuitry 154 in response to an applied column address. Thus, a row and column address is provided for each pixel. The CMOS imager 150 is operated by a control circuit (not shown), which controls the row and column circuitry for selecting the appropriate row and column lines for pixel readout.

The CMOS imager 150 illustrated in FIG. 6 uses a four path readout architecture, one path for red, blue, and two green paths. That is, the imager 150 includes a first path (designated as G1), a second path (designated as G2), a third path (designated as R) and a fourth path (designated as B) for pixel and reset signals readout of the array 152. Each readout path G1, G2, R, B is used to readout one quarter the number of pixels connected to the column S/H circuitry 154. Further, each path G1, G2, R, B is broken down into several parallel readout channels depending on the number of columns in the array 152. Two analog-to-digital readout channels are shown in FIG. 6 for each color path G1, G2, R, B, but, as noted more than two channels may be used depending on the size of the pixel array. The first and second paths G1, G2 output analog reset and pixel signals associated with green pixels while the third and fourth paths R, B output analog reset and pixel signals associated with red and blue pixels, respectively.

Once readout, the green analog reset and pixel signals, from the first path G1, pass through amplifiers 170, 170' and an analog-to-digital converters (ADCs) 161, 161' before being processed as digital signals by a digital block 166. Similarly, the second path G2 is readout out through amplifiers 172, 172' and analog-to-digital converters 162, 162'. The red and blue paths are similarly readout through respective amplifiers 173, 173', 174, 174' and analog-to-digital converters (ADC) 163, 163', 164, 164', respectively. After a pixel signal passes through the readout path, the signal is processed by digital block 166. FIG. 6 illustrates two parallel readout channels for each color path, however, as previously noted, two or more readout channels may be employed for each color path. The parallel analog-to-digital readout paths prevent an increase in the parasitic capacitance of each channel and decrease noise, and the calibration provided by the invention mitigates against boundary effects.

Figure 7:
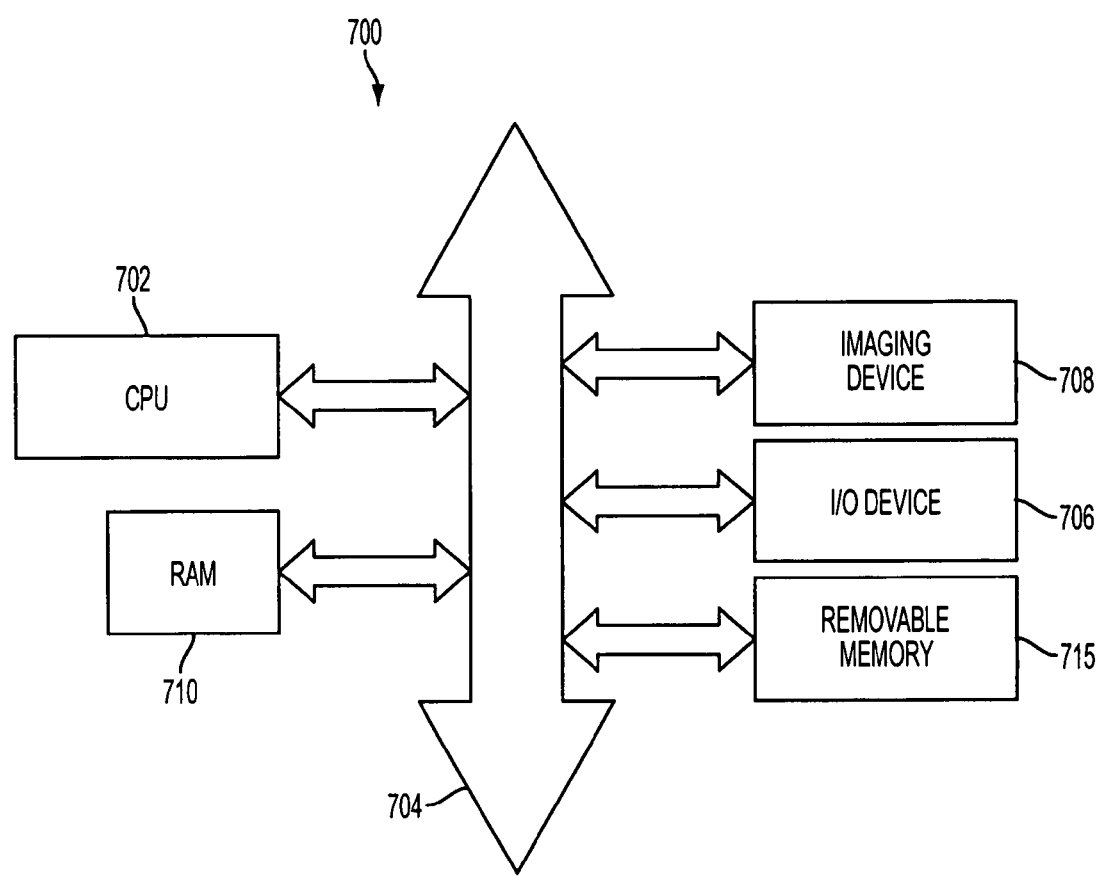
FIG. 7 illustrates a processor system incorporating at least one imaging device constructed in accordance with an embodiment of the invention.

FIG. 7 shows system 700, a typical processor system modified to include an imaging device 708 constructed in accordance with an embodiment of the invention. The imaging device 708 includes the circuitry illustrated in FIG. 6. The processor-based system 700 is exemplary of a system having digital circuits that could include image sensor devices. Without being limiting, such a system could include a computer system, camera system, scanner, machine vision, vehicle navigation, video phone, surveillance system, auto focus system, star tracker system, motion detection system, and image stabilization system, or other systems relying on an image input.

System 700, for example a camera system, generally comprises a central processing unit (CPU) 702, such as a microprocessor, that communicates with an input/output (I/O) device 706 over a bus 704. Imaging device 708 also communicates with the CPU 702 over the bus 704. The processor-based system 700 also includes random access memory (RAM) 710, and can include removable memory 715, such as flash memory, which also communicates with the CPU 702 over the bus 704. The imaging device 708 may be combined with a processor, such as a CPU, digital signal processor, or microprocessor, with or without memory storage on a single integrated circuit or on a different chip than the processor. It is also possible to integrate the CPU 702, RAM 710 and imaging device 708 on the same integrated circuit chip.

The processes and devices described above illustrate exemplary methods and typical devices of many that could be used and produced. The above description and drawings illustrate embodiments, which achieve the objects, features, and advantages of the present invention. However, it is not intended that the present invention be strictly limited to the above-described and illustrated embodiments. Any modification, though presently unforeseeable, of the present invention that comes within the spirit and scope of the following claims should be considered part of the present invention.

What is claimed as new and desired to be protected by Letters Patent of the United States is:

1. A method of reading out a pixel array comprising the steps of:
   utilizing at least one readout path connected to said pixel array, each readout path having at least two readout channels, wherein each readout channel comprises an analog-to-digital converter; and
   calibrating the at least one readout path by:
   reading a first pixel signal through at least two readout channels of one of said at least one readout path; and
   calibrating said readout channels, by a calibration circuit, based on the results of said first pixel signal being processed by said each of said at least two readout channels.

2. The method of claim 1, wherein said calibrating said at least one readout path further comprises:
   reading out a second pixel signal through a readout channel having previously been calibrated and at least one additional un-calibrated readout channel; and
   calibrating said at least one un-calibrated readout channel according to the previously calibrated readout channel based on the results of said second pixel signal being processed by said calibration circuit.

3. The method of claim 1, further comprising the step of reading out said pixel array by said at least one readout path having calibrated readout channels.

4. The method of claim 3, wherein said readout and said calibration are preformed by different circuits.

5. The method of claim 1, wherein said at least one readout path includes at least three readout channels.

6. The method of claim 1, wherein each readout channel includes an amplifier and an analog-to-digital converter.

7. The method of claim 1, wherein the calibration step further comprises calibrating said readout channels such that a gain offset of said at least two readout channels approaches zero.

8. The method of claim 2, wherein the calibration step further comprises calibrating said readout channels such that a gain offset of said previously calibrated and said additional readout channels approaches zero.

9. The method of claim 1, wherein the calibration step further comprises calibrating said channels such that a gain of each of the channels is substantially the same.

10. The method of claim 2, wherein the calibration step further comprises calibrating said channels such that a gain of all readout channels comprised by said at least one readout path is substantially the same.

11. The method of claim 1, wherein said readout paths are readout by color and each color having at least two readout channels.

12. The method of claim 1, wherein said pixels are readout by color and said at least one readout path includes at least one red, one blue and two green readout paths.

13. The method of claim 1, wherein said step of calibrating at least one readout path comprises the acts of:
   reading out said first pixel signal through first and second readout channels of a first readout path;
   determining a signal processing variation between said first and second readout channels;
   adjusting said second readout channel, based on said first pixel signal readout of said first readout channel, to reduce said signal processing variation between said first and second readout channels;
   reading out a second pixel signal through said second readout channel and a third readout channel of said first readout path;
   determining a signal processing variation between said second and third readout channels; and
   adjusting said third readout channel, based on said second pixel signal readout of said second readout channel, to reduce said signal processing variation between said second and third readout channels.

14. A pixel readout circuit for an imager comprising:
   at least one readout path for reading out respective signals from pixel cells of a pixel array of said imager, each readout path having a plurality of parallel readout channels, each readout channel comprising:
   an amplifier for amplifying a signal from a pixel array; and
   an analog-to-digital converter for digitizing an output from said amplifier;
   a circuit for reading out a signal of a first pixel cell to each of said amplifiers of said parallel readout channels; and
   a calibration circuit for calibrating said parallel readout channels based on respective outputs of said amplifiers of said parallel readout channels produced by amplifying said signal of said first pixel cell.

15. The readout circuit according to claim 14, wherein said at least one readout path is readout by color and said at least one readout path comprises a red readout path, a blue readout path and two green readout paths.

16. The readout circuit according to claim 14, wherein said calibration circuit determines the calibration of at least two parallel readout channels by reading out a plurality of the same pixel signals from said pixel array to each of said parallel readout channels.

17. The readout circuit according to claim 16, wherein gains of the readout channels are adjusted so that the gains are substantially the same.

18. The readout circuit according to claim 16, wherein offsets of the readout channels are adjusted such that the offset approaches zero.

19. The readout circuit according to claim 14, wherein the readout channels of said at least one readout path are calibrated based on the readout channels of at least a second readout path.

20. The readout circuit according to claim 14, wherein the calibration circuit further determines the calibration of an additional un-calibrated readout channel by reading out a second pixel signal from said array through one of said calibrated readout channels and said un-calibrated readout channel and determines offset and gain differences.

21. The readout circuit according to claim 14, wherein said pixel signal is single ended.

22. The readout circuit according to claim 14, wherein said pixel signal is differential.

23. An imager comprising:
an array of pixels;
at least one readout path for reading out signals from a pixel array, each readout path having a plurality of parallel readout channels, each readout channel comprising:
an amplifier for amplifying signals from a pixel array; and
an analog-to-digital converter for digitizing an output from said amplifier;
a calibration circuit for calibrating said parallel readout channels by comparing outputs of said amplifiers receiving the same pixel signal.

24. The imager according to claim 23, wherein said at least one readout path is readout by color and said at least one readout path comprises a red readout path, a blue readout path and two green readout paths.

25. The imager according to claim 23, wherein said calibration circuit determines the calibration of at least two parallel readout channels by reading out a plurality of the same pixel signals from said pixel array to each of said parallel readout channels and determining offset and gain differences.

26. The imager according to claim 25, wherein the gains of the readout channels of said at least one readout path are adjusted so that the gains are substantially the same.

27. The imager according to claim 25, wherein the an offset of the readout channels of said at least one readout path is adjusted such that the offset approaches zero.

28. The imager according to claim 23, wherein the calibration circuit further determines the calibration of an additional un-calibrated readout channel by reading out a second pixel signal from said array through one of said calibrated parallel readout channels and said un-calibrated parallel readout channel and determines the offset and gain differences.

29. The imager according to claim 25, wherein said first pixel signal is single ended.

30. The imager according to claim 25, wherein said first pixel signal is differential.

31. The imager according to claim 23, wherein the readout channels of said at least one readout path are calibrated based on the readout channels of at least a second readout path.

32. The imager of claim 23, wherein said calibration circuit is configured to determine a first signal processing variation between said first and second readout channels of a first readout path, determine a second signal processing variation between said second readout channel and a third readout channel of said first readout path, and adjust said first, second, and third readout channels such that each of said first, second, and third readout channels output the same value when reading out the same signal.

* * * * *